United States Patent [19]

Rutgersson

[11] Patent Number: 4,780,945
[45] Date of Patent: Nov. 1, 1988

[54] METHOD AND AN IMPLEMENT ARRANGEMENT FOR THE REMOVAL OF FASTENERS IN THE FORM OF RINGS

[76] Inventor: Göran Rutgersson, Ekebacken, S-440 30 Marstrand, Sweden

[21] Appl. No.: 74,540

[22] PCT Filed: Nov. 6, 1985

[86] PCT No.: PCT/SE85/00437
§ 371 Date: Jul. 2, 1987
§ 102(e) Date: Jul. 2, 1987

[87] PCT Pub. No.: WO87/02926
PCT Pub. Date: May 21, 1987

[51] Int. Cl.⁴ .............................................. B23P 19/00
[52] U.S. Cl. ..................................... 29/426.5; 100/214
[58] Field of Search .................. 24/140, 141, 142; 29/239, 243.52, 426.5; 100/214 X

[56] References Cited

U.S. PATENT DOCUMENTS

| | | | |
|---|---|---|---|
| 2,807,081 | 9/1957 | Black | 29/252 R |
| 3,890,695 | 6/1975 | Gaastra | 24/141 X |
| 4,615,208 | 10/1986 | Hailey | 100/214 X |

Primary Examiner—Timothy V. Eley
Assistant Examiner—Frances Chin

[57] ABSTRACT

A method and an implement for the removal of rings (3) from material (1) such as canvas. The ring exhibits a flange-like side part (7, 9) to either side of the material, which side parts are attached to a tubular part (8) which extends through a hole (2) in the material. Removal is effected by the ring (3) being pressed between two parts (4, 5) of an implement, one (4) of which parts is forced against one side of the ring adjacent to its inner edge (16), and the other (5) is forced against the other side adjacent to the outer edge (20) of the ring. In this way a radial distance is provided between the engaging edges of both implements, and the ring is subjected to a tilting moment which, when the parts of the implement are pressed together, produces the conical form which causes it to be released from the material.

1 Claim, 2 Drawing Sheets

METHOD AND AN IMPLEMENT ARRANGEMENT FOR THE REMOVAL OF FASTENERS IN THE FORM OF RINGS

TECHNICAL FIELD

In conjunction with sails and other canvas materials use is made of fasteners in the form of rings which afford protection to holes made in the canvas. In line with the increasing strength of the canvas material imparted by new fibres and manufacturing processes, it has been necessary to adapt the rings to suit the higher stresses which are imposed on the canvas. In order to achieve increased strength in the ring and to improve its holding properties, rings have been produced from very strong material and with a toothed engagement in the canvas. A ring of this kind is disclosed in British Pat. No. 2 123 337, Rutgersson.

Technical Problem

The rings are permanently installed as a general rule, although in certain cases it is necessary to make changes or to carry out repairs of a kind which require one or more of the rings to be removed. The removal of the rings is made more difficult by the increased strength of the rings and their improved holding properties. Removal is made particularly difficult and is associated with a considerable risk of damage to the canvas in the case of those rings which, like the ring in accordance with the indicated patent, are equipped with tags which penetrate through the canvas and are also curved at their tips. The removal of such rings generally requires the outer parts of the rings to be parted, for example by grinding, and for the teeth to be bent out, in the event of these being bent around the canvas, one by one so that they can be withdrawn together with that part of the ring to which they are attached.

The object of the present invention is to make available a method for the removal of rings, in particular those which are used in sails and other canvas materials which are of the heavy-duty type, executed in accordance with what is stated in this patent, for example. The invention also relates to an implement arrangement which can be used for the execution of the method.

The Solution

Removal is effected by the ring being pressed between two implement parts, one of which implement parts is forced against one side of the ring along a line which is concentric with the tubular part on its edge, and the other part of the implement on the other side of the ring is forced along a line which follows the ring on its outer edge. A radial distance is thus provided between the engaging edges of both implements, in this way subjecting the ring to a tilting movement, viewed over its cross-section, which, when the parts of the implement are pressed together, produces the conical form with a progressively reducing angle until that side part against which the first part of the implement is in engagement assumes an at least near enough cylindrical appearance, in which case said ring-shaped part of the ring can be released through being enabled to pass over the last-mentioned, compressed side part whilst the ring-shaped part is likewise caused to adopt a concial form. The arrangement comprises the two parts of the implement for the aforementioned engagement circumstances.

Advantages

What is achieved through the invention is that rings, including those of the heavy-duty kind and those which are equipped with teeth, can be removed without the canvas being damaged and in such a way that the teeth can be withdrawn from the canvas without ripping it.

Removal can be executed in accordance with the method and with the help of the implement arrangement as a single operation in a force-applying arrangement such as a press. Such force-applying arrangements are used by all those who are involved with the fitting of rings of the aforementioned heavy-duty type. Removal can thus largely be executed using existing equipment.

BRIEF DESCRIPTION OF THE DRAWINGS

The method in accordance with the invention is illustrated stage by stage in the accompanying drawyings, from which the implement arrangement can also be appreciated.

Figure 1:
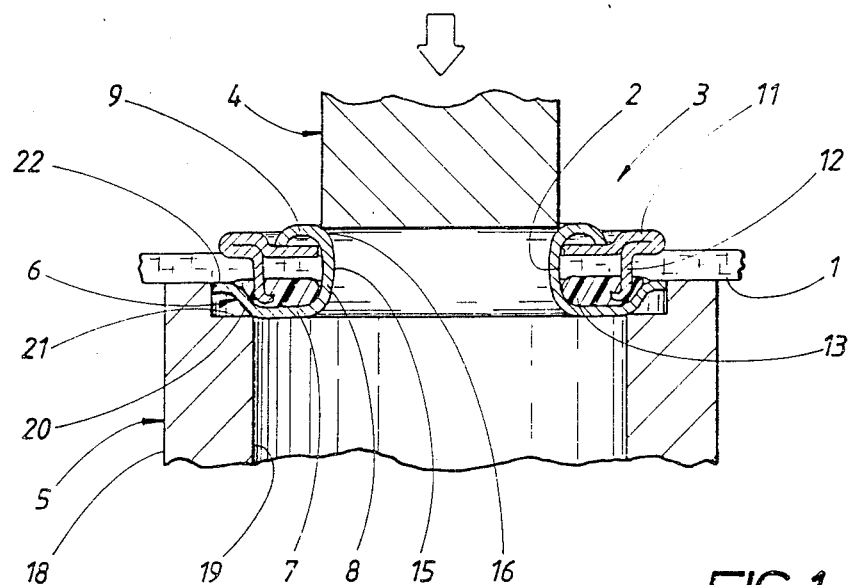
FIGS. 1-3 illustrate different stages in the removal operation, from the securely installed ring in a state in which it has not yet been processed ready for removal, to the fully released ring.

All the Figures present a central cross-section through the ring and the surrounding part of a piece of canvas in which it is fitted, together with parts of the implement arrangement, which latter is also presented as a central cross-section.

BEST MODE OF CARRYING OUT THE INVENTION

The designation 1 is used in the Figures in respect of a canvas with a circular hole 2 and a ring 3 fitted around the area of the canvas surrounding the hole. The implement arrangement is also shown in the Figure as a mandrel 4 and a support 5 in tubular form.

FIG. 1 shows the ring 3 in a securely installed state before it has yet been subjected to the removal operation. In this state the ring exhibits a circular main component 6 made of a metal such as stainless steel. The main component 6 exhibits a first, flangelike side part 7 which is transformed into a tubular part 8, which is in turn transformed into a second side part 9 on the opposite side of the canvas in relation to the position of the side part 7. The tubular part 8 has its diameter adapted to suit the hole 2 through the canvas 1. The side part 9 has been produced by imparting outward curvature to the tubular part 8, which, in the manufactured state of the main component 6, is fully cylindrical and also includes the material which now forms the side part 9.

The ring 3 also incorporates adjacent to the side part 9 a ring 11 with teeth 12 positioned in a circular row and made of a metal such as stainless steel. Adjacent to the side part 7 is a further ring 13 made of plastic.

In conjunction with the installation of the ring 3, the aforementioned cylindrical part, of which the part 8 constitutes a part, is pushed through the hole 2 in the canvas 1 after the plastic ring 13 has first been placed against the side part 7. The ring 11 with the teeth 12 is then positioned, which teeth face straight towards the canvas in this position. Considerable force is then applied so as to cause the cylindrical part to curve outwards to form the flange-like side part 9, in conjunction with which the teeth 12 are forced through the canvas 1 and penetrate through the plastic ring 13 and are bent in the manner illustrated in FIG. 1 against the side part 7, which is discshaped for this purpose. The ring is now securely retained, partly by the holding action in the canvas of the teeth 12 arranged in the form of a ring, for which purpose the teeth are supported by the plastic ring 13, and partly by the clamping of the canvas which is produced through the pressure of the ring 11 and the plastic ring 13 exerted by the side parts 7 and 9 which are curved in towards one another.

The parts of the implement have their dimensions adapted to suit the diameter of a ring which is to be removed. The mandrel 4 must accordingly exhibit a diameter which is slightly larger than the diameter of the hole 15 which extends thorough the tubular part 8 of the ring 3. The mandrel 4 must not, however, be so large as to project beyond the axial external surface of the side part 9, against which it must be situated during the operation for the removal of the ring. As will be appreciated from FIG. 1, the ring must engage in the transition between the hole 15 and the side part 9. This transition is executed as a radius 16.

The supporting part 5 of the implement is executed as a tube with an external periphery 18, the size of which is essentially of no significance, and an internal periphery 19 with a cylindrical surface. The diameter of the inner periphery 19 is such that its end edge is in contact with the radius 20 which, like the radius 16, forms the transition between an axial surface of the ring, in this case on the main part 6, and a surface with an essentially cylindrical arrangement, in this case the external periphery of the part 6. The peripheral surface 19 is terminated on said edge by an axial surface 21 in the part 5 of the implement, and the latter must thus not extend to any significant degree into the axial surface of the main part 6, but must not be situated outside its periphery, either. The axial surface 21 constitutes the bottom of a depression, the wall 22 of which constitutes a guide for the outward-bend edge of the main part 6 of the aforementioned peripheral surface which is in contact with the radius 20. The ring can be centred in this way in the part 5 of the implement, so that the edge of the peripheral surface 19 engages concentrically along the radius 20.

The part 4 of the implement must also be arranged concentrically with the ring. In conjunction with the use of the implement in a press, the parts 4, 5 of the implement must, in fact, be capable of being moved towards one another with considerable force, with centring between the parts of the implement being effected with the help of centring devices in the press. In the event of it being necessary for the removal operation to be performed in a hand tool, this should preferably be executed with a draw-in bolt which extends through the centre of the two parts of the implement and centres these in relation to one another. In this case the mandrel 4 must be provided with a hole for the bolt. The supporting part 5 for its part must be executed with a base with a transcurrent hole or with a washer to provide support for the bolt. It is possible in this way, by threading a nut onto the bolt, for the parts 4, 5 to be drawn towards one another in the manner described below.

Figure 2:
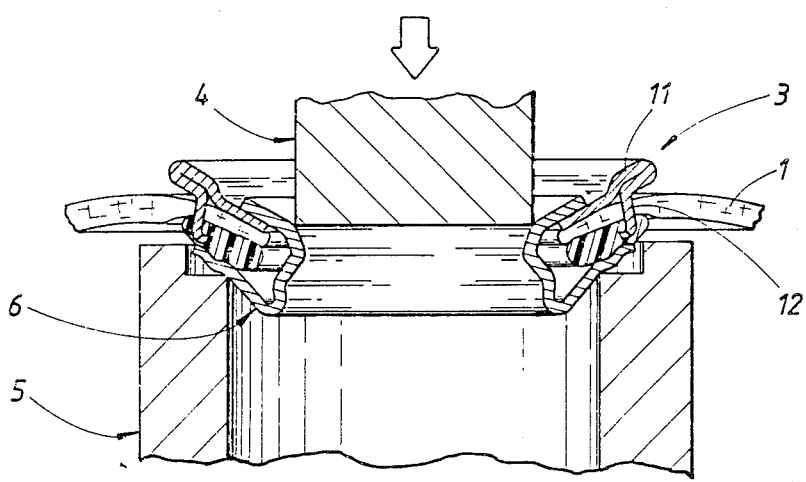

As will have been appreciated from the foregoing, removal of the ring 3 requires the ring to be laid in the depression in the supporting part 5, in which a way that the ring is centred by the peripheral surface 22. The mandrel 4 is then placed in a concentric position in relation to the inner peripheral surface 19 of the supporting part 5 and has a considerable downward force exerted on it. Since the ring rests with its outer edge against the supporting part 5, whereas the mandrel 4 engages on the internal edge of the ring along a circular line inside the circular line at the edge of the peripheral surface 19 where the ring is supported, it will be subjected along its circular, curved cross-section to a moment which endeavours to impart conical form to the ring in the manner illustrated in FIG. 2. The side part 9 will thus rise more and more whilst the cylindrical part 8 begins to adopt the form of a bellows.

Because of the pressure exerted against the toothed ring 11 by the side part 9, the toothed ring will also adopt concial form, and the teeth 12 will be caused to be deflected outwards at their ends. The plastic ring 13 and the canvas 1 generate little resistance and are deformed as the madrel 4 and the supporting part 5 are compressed.

Figure 3:
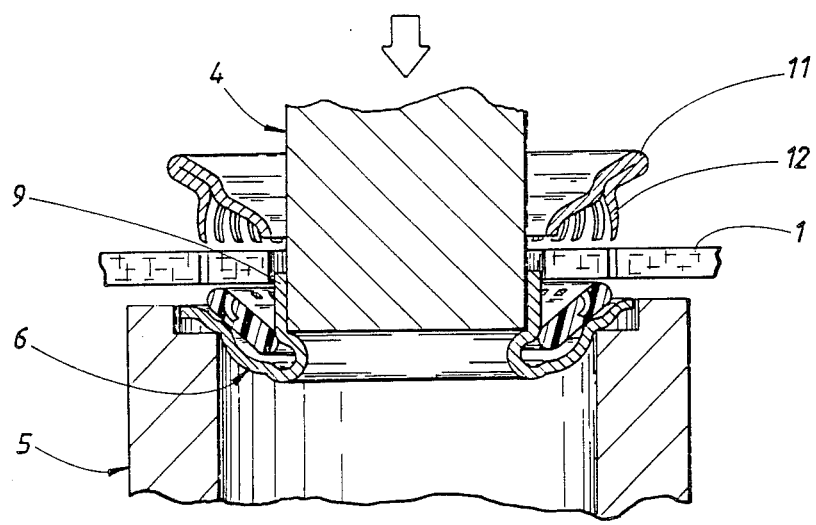

As the compression continues, the angle of the conical form will become smaller and smaller, and the outer edge of the side part 9 and the inner edge of the toothed ring 11 will approach closer and closer to one another, in conjunction with which the rotating moment of the parts will increase. As the compression continues, the side edge part 9 will slide through the toothed ring 11 and will then adopt cylindrical or near enough cylindrical form; it is shown in FIG. 3 as being forced against the cylindrical outer surface of the mandrel 4.

Once the outer edge of the side part 9 and the inner edge of the toothed ring 11 have moved past one another, the two retaining parts of the ring, the main part 6 and the toothed ring 11, will have been separated from one another at the same time as the retaining force between the side parts 7 and 9 will have been removed. The ring is thus no longer retained as a joint around the edge of the canvas 1, and the canvas is released and is able to straighten out.

As has already been mentioned, the teeth 12 will have described a curving action during the operation and are withdrawn from the plastic ring 13 in this way, as well as being straightened to a certain extent. In the final phase the teeth extend largely in an axial direction and can be withdrawn from the canvas in this way, leaving only holes without tearing apart the canvas. No straightening operation for the teeth is required, as a general rule, and the ring can be removed relatively easily by pulling it in an axial sense if, as can be the case, if has not lost its grip on the canvas in conjunction with the compressing action of the parts of the implement.

As will have been appreciated from the above, the underlying idea of the invention is that the parts of the implement engage in a concentric manner along the outer periphery of the ring from one side and along its inner periphery from the other side, in such a way that a twisting action is imparted to same. In this way the ring adopts a conical form with a progressively smaller angle the further the parts of the implement are forced together. The previously connected and overlapping part is now imparted with almost cylindrical form and releases the previously securely pressed tooth ring. This is also imparted with conical form, which gives the teeth a tendency to extend axially, making them easy to release.

The invention is not entirely restricted to the type of ring illustrated and referred to by way of introduction, and the method in accordance with the invention may conceivably also be applied to other types of ring.

The method and the implement in accordance with the invention naturally have the greatest significance for heavy-duty rings, which are difficult to remove, and in particular for those rings which have an inner ring situated between outward-curved flanges. The invention can also be applied to rings with a form other than circular, if such rings exist. The implements must be adapted in this case to suit the form of the ring in order to engage on the internal and external edges, as stated.

I claim:

1. A method for removal of rings from a flexible material such as canvas, a ring, which is attached to the material and to be removed from the same, including two annular flanges, each with an outer and an inner edge, and between portions adjacent to the inner edge of each flange a tubular portion, the tubular portion extending through a hole in the material and the flanges being pressed against opposite surfaces of the material, thereby anchoring the ring to the material; the method including placing the ring, attached to the material and intended to be removed, on an annular support having a supporting surface extending around a hole and adapted to support one flange of the ring along a narrow portion at the outer edge of said one flange, the portion and inwardly being defined by an inner edge of the supporting surface;

positioning an end surface of a mandrel against the other flange, the end surface of the mandrel being placed in contact with a narrow portion along the inner edge of said other flange, the portion outwardly being defined by an outer edge of the mandrel, which outer edge of the mandrel, along its periphery, is at a distance from said inner edge of the supporting surface;

moving the mandrel towards the support and into the hole of the support;

performing the movement until an inner portion of the ring at its tubular portion is pressed down into the hole of the support and the flanges having become deformed to the shape of a frustrum of a cone; and pulling the material away with its portion adjacent to its hole out from its position between the deformed flanges.

* * * * *